United States Patent
Gu et al.

(10) Patent No.: US 10,080,212 B2
(45) Date of Patent: Sep. 18, 2018

(54) METHOD AND DEVICE FOR UPDATING SYSTEM INFORMATION, METHOD AND DEVICE FOR ACQUIRING SYSTEM INFORMATION

(71) Applicant: SPREADTRUM COMMUNICATIONS (SHANGHAI) CO., LTD., Zhangjiang, Shanghai (CN)

(72) Inventors: Xiangxin Gu, Shanghai (CN); Huayu Zhou, Shanghai (CN); Yun Deng, Shanghai (CN)

(73) Assignee: SPREADTRUM COMMUNICATIONS (SHANGHAI) CO., LTD., Zhangjiang, Shanghai (CN)

( * ) Notice: Subject to any disclaimer, the term of this patent is extended or adjusted under 35 U.S.C. 154(b) by 66 days.

(21) Appl. No.: 15/403,447

(22) Filed: Jan. 11, 2017

(65) Prior Publication Data
US 2018/0049159 A1     Feb. 15, 2018

(30) Foreign Application Priority Data

Aug. 12, 2016  (CN) .......................... 2016 1 0666424

(51) Int. Cl.
*H04W 72/00*   (2009.01)
*H04W 48/10*   (2009.01)
*H04W 72/04*   (2009.01)

(52) U.S. Cl.
CPC ......... *H04W 72/005* (2013.01); *H04W 48/10* (2013.01); *H04W 72/0413* (2013.01)

(58) Field of Classification Search
None
See application file for complete search history.

(56) References Cited

U.S. PATENT DOCUMENTS

| | | | |
|---|---|---|---|
| 9,113,442 B2 * | 8/2015 | Pradas | H04W 74/08 |
| 2011/0105105 A1 * | 5/2011 | Sagfors | H04W 48/12 455/422.1 |
| 2015/0173089 A1 * | 6/2015 | Baghel | H04W 4/90 370/329 |
| 2015/0249952 A1 * | 9/2015 | Lee | H04W 4/06 370/312 |
| 2016/0234735 A1 * | 8/2016 | Kubota | H04W 48/14 |
| 2017/0265165 A1 * | 9/2017 | Li | H04W 72/005 |
| 2018/0035468 A1 * | 2/2018 | Ishii | H04W 74/0833 |

* cited by examiner

*Primary Examiner* — Brian Roberts
(74) *Attorney, Agent, or Firm* — Cantor Colburn LLP (57) ABSTRACT

A method and a device for updating system information, a method and a device for acquiring system information, the method for updating a system information includes: when the system information changes, informing a UE that the system information changes, the system information includes essential system information and non-essential system information; from a next cycle, in each of N cycles, broadcasting the essential system information and the non-essential system information, N is an integer greater than or equal to 1; after the successive N cycles, in response to a request from the UE through a dedicated channel of the UE, sending at least a part of the non-essential system information to the UE through the dedicated channel of the UE, where the request indicates that the UE fails to receive the non-essential system information from the broadcasting. Accordingly, system resource consumption is reduced.

32 Claims, 3 Drawing Sheets

METHOD AND DEVICE FOR UPDATING SYSTEM INFORMATION, METHOD AND DEVICE FOR ACQUIRING SYSTEM INFORMATION

CROSS-REFERENCE TO RELATED APPLICATIONS

This application claims the benefit of priority to Chinese Patent Application No. 201610666424.0, filed on Aug. 12, 2016, and entitled "METHOD AND DEVICE FOR UPDATING SYSTEM INFORMATION, METHOD AND DEVICE FOR ACQUIRING SYSTEM INFORMATION", and the entire disclosure of which is incorporated herein by reference.

TECHNICAL FIELD

The present disclosure generally relates to communication technical field, and more particularly, to a method and a device for updating system information, and a method and a device for acquiring system information.

BACKGROUND

In a wireless cellular communication system, for acquiring network services, a UE (User Equipment) needs to know related configuration information of a current service cell, and a cell reselection in a moving process of the UE also needs to acquire adjacent cells' configuration information, such as a channel bandwidth, a system frame number, a network ID, residing availability, a configuration relating to measurement. All this configuration information is called system information.

The system information is classified into essential system information and non-essential system information. The essential system information of a cell include fundamental information relevant to residing in and accessing to the cell. Usually, the essential system information system information has a relatively small volume and is broadcasted. The non-essential system information refers to system information other than the essential system information and may be sent to the UEs in a cell through dedicated channel. Under conditions, such as updating, re-configuring or call barring of a cell, the system information changes and all UEs in the cell should be informed to acquire the updated system information.

However, sending all the updated non-essential SI (System Information) to every UE in the cell through dedicated channel will cost too much radio resources while system information updating.

SUMMARY

The present disclosure provides a method and a device for updating system information, and a method and a device for acquiring system information, to solve the problem of high resource consumption.

The present disclosure provides a method for updating system information, the method includes: when the system information changes, informing a UE (User Equipment) that the system information changes, where the system information includes essential system information and non-essential system information; from a next cycle, in each of successive N cycles, broadcasting the essential system information and the non-essential system information, where N is an integer greater than or equal to 1; and after the successive N cycles, in response to a request from the UE through a dedicated channel of the user equipment, sending at least a part of the non-essential system information to the user equipment through the dedicated channel of the user equipment, where the request indicates that the user equipment fails to receive the non-essential system information from the broadcasting.

In some embodiments, the method for updating system information further includes: when the system information does not change, in response to a request from the UE through the dedicated channel of the UE, sending at least a part of the non-essential system information to the UE.

In some embodiments, the non-essential system information is broadcasted through a physical downlink shared channel, and the UE is informed about updated system information through a SI-RNTI (System Information Radio Network Temporary Identity) during broadcasting.

In some embodiments, a number of the successive N cycles is a preset integer agreed with the UE.

In some embodiments, when broadcasting the essential system information in each of the successive N cycles, the essential system information carries remaining number of times information to inform the UE about remaining number of times for broadcasting the non-essential system information.

In some embodiments, the essential system information carries scheduling information of the non-essential system information, so that the UE can receive the non-essential system information according to the scheduling information.

In some embodiments, the non-essential system information includes first non-essential system information and other non-essential system information, and the first non-essential system information carries scheduling information of the other non-essential system information, so that the UE can receive the other non-essential system information according to the scheduling information.

In some embodiments, when broadcasting the non-essential system information, the first non-essential system information is broadcasted according to a manner agreed with the UE.

The present disclosure further provides a method for acquiring system information, including: determining if indication information from a base station is received, where the indication information indicates that the system information changes, the system information includes essential system information and non-essential system information, and the non-essential system information includes target non-essential system information associating to a UE (User Equipment); when the indication information is received, from a next cycle, in successive N cycles, attempting to receive the essential system information and the target non-essential system information broadcasted by the base station, where N is an integer greater than or equal to 1; if in the successive N cycles, the target non-essential system information is not received successfully, after the successive N cycles, sending a request to the base station through a dedicated channel of the UE; and receiving, on the dedicated channel, the target non-essential system information from the base station in response to the request.

In some embodiments, the method for acquiring system information further includes: if the indication information is not received, requesting, through the dedicate channel, the base station to send the target non-essential system information; and receiving, at the dedicated channel, the target non-essential system information from the base station.

In some embodiments, when attempting to receive target non-essential system information broadcasted by the base station, the target non-essential system information is received on a physical downlink shared channel according to an indication of a SI-RNTI (System Information Radio Network Temporary Identity).

In some embodiments, a number of the successive N cycles is a preset integer agreed with the base station.

In some embodiments, when attempting to receive essential system information and target non-essential system information broadcasted by the base station in each of the successive N cycles, remaining number of times information is obtained from the essential system information, so as to determine remaining number of times for broadcasting the target non-essential system information.

In some embodiments, when attempting to receive essential system information broadcasted by the base station in each of the successive N cycles, scheduling information of the target non-essential system information is obtained from the essential system information, so as to receive the target non-essential system information according to the scheduling information.

In some embodiments, the non-essential system information includes first non-essential system information and other non-essential system information, the target non-essential system information is included in the other non-essential system information, and before attempting to receive the target non-essential system information broadcasted by the base station in each of the successive N cycles, scheduling information is obtained from the first non-essential system information, so as to receive the target non-essential system information according to the scheduling information.

In some embodiments, before attempting to receive the target non-essential system information broadcasted by the base station, the first non-essential system information is received according to a manner agreed with the base station.

The present disclosure further provides a device for updating system information, including: an informing circuitry configured to: when the system information changes, inform a UE (User Equipment) that the system information changes, wherein the system information includes essential system information and non-essential system information; a broadcasting circuitry configured to: from a next cycle, in each of successive N cycles, broadcast the essential system information and the non-essential system information, wherein N is an integer greater than or equal to 1; and a first sending circuitry configured to: after the successive N cycles, in response to a request from the UE through a dedicated channel of the UE, send at least a part of the non-essential system information to the UE through the dedicated channel of the UE, wherein the request indicates that the UE fails to receive the non-essential system information from the broadcast.

In some embodiments, the device for updating system information further includes: a second sending circuitry configured to: when the system information does not change, in response to a request from the UE through the dedicated channel of the UE, send at least a part of the non-essential system information to the UE.

In some embodiments, the broadcasting circuitry broadcasts the non-essential system information through a physical downlink shared channel, and informs the UE that the system information changes through a SI-RNTI (System Information Radio Network Temporary Identity) during broadcasting.

In some embodiments, a number of the successive N cycles is a preset integer agreed with the UE.

In some embodiments, when the broadcasting circuitry broadcasts the essential system information in each of the successive N cycles, the essential system information carries remaining number of times information to inform the UE about remaining number of times for broadcasting the non-essential system information.

In some embodiments, the essential system information carries scheduling information of the non-essential system information, so that the UE can receive the non-essential system information according to the scheduling information.

In some embodiments, the non-essential system information includes first non-essential system information and other non-essential system information, and the first non-essential system information carries scheduling information of the other non-essential system information, so that the UE can receive the other non-essential system information according to the scheduling information.

In some embodiments, when the broadcasting circuitry broadcasts the non-essential system information, the first non-essential system information is broadcasted according to a manner agreed with the UE.

The present disclosure further provides a device for acquiring system information, including: a determining circuitry configured to: determine if indication information from a base station is received, wherein the indication information indicates that the system information changes, the system information includes essential system information and non-essential system information, and the non-essential system information includes target non-essential system information associating to a UE (User Equipment); an attempting to receive circuitry configured to: when the indication information is received, from a next cycle, in successive N cycles, attempt to receive the essential system information and the target non-essential system information broadcasted by the base station, where N is an integer greater than or equal to 1; a first requesting circuitry configured to: if in the successive N cycles, the target non-essential system information is not received successfully, after the successive N cycles, send a request to the base station through a dedicated channel of the UE; and a first receiving circuitry configured to: receive, on the dedicated channel, target non-essential system information from the base station in response to the request.

In some embodiments, the device for acquiring system information further includes: a second requesting circuitry configured to: if the indication information is not received, request, through the dedicate channel, the base station to send the target non-essential system information; and a second receiving circuitry configured to: receive, at the dedicated channel, the target non-essential system information from the base station.

In some embodiments, when the attempting to receive circuitry attempts to receive target non-essential system information broadcasted by the base station, the target non-essential system information is received on a physical downlink shared channel according to an indication of a SI-RNTI (System Information Radio Network Temporary Identity).

In some embodiments, a number of the successive N cycles is a preset integer agreed with the base station.

In some embodiments, the first receiving circuitry is configured to: when attempts to receive essential system information and target non-essential system information broadcasted by the base station in each of the successive N cycles, obtain remaining number of times information from the essential system information, so as to determine remaining number of times for broadcasting the target non-essential system information.

In some embodiments, when the attempting to receive circuitry attempts to receive essential system information broadcasted by the base station in each of the successive N cycles, scheduling information of the target non-essential system information is obtained from the essential system information, so as to receive the target non-essential system information according to the scheduling information.

In some embodiments, the non-essential system information includes first non-essential system information and other non-essential system information, the target non-essential system information is included in the other non-essential system information, and the attempting to receive circuitry is configured to: before attempt to receive the target non-essential system information broadcasted by the base station in each of the successive N cycles, obtain scheduling information the first non-essential system information, so as to receive the target non-essential system information according to the scheduling information.

In some embodiments, the attempting to receive circuitry is configured to: before attempt to receive the target non-essential system information broadcasted by the base station, receive the first non-essential system information according to a manner agreed with the base station.

In comparison with exiting technologies, technical solutions according to embodiment of the present disclosure possess following advantages:

In the present disclosure, when system information changes, in successive N cycles from the next cycle, the essential system information and the non-essential system information are broadcasted in the same time, and if the UE fails to receive the non-essential system information in the successive N cycles, the user equipment requests, through a dedicated channel, the base station to send the non-essential system information. Accordingly, the present disclosure avoids the problem of high resource consumption caused by directly using the dedicated channel to request the base station to send the non-essential system information.

Further, in embodiments of the present disclosure, when broadcasting the essential system information and the non-essential system information in successive N cycles, the essential system information carries remaining number of times for broadcasting the non-essential system information, so that each time when the UE receives the essential system information, the UE can learn a number of times that the non-essential system information can be received. Accordingly, an efficiency and an accuracy for the UE receiving the non-essential system information are improved.

Further, in embodiments of the present disclosure, when broadcasting the essential system information and the non-essential system information in successive N cycles, the essential system information or the first essential system information carries scheduling information, so that the UE can receive needed non-essential system information according to the scheduling information. Accordingly, the efficiency and the accuracy for the UE receiving the non-essential system information are further improved.

DETAILED DESCRIPTION

As recited in the background, under conditions, such as updating, re-configuring or call barring of a base station, the system information changes and all UEs in the cell should be informed to acquire the updated system information. However, sending all the updated non-essential SI to every UE in the cell through dedicated channel will cost too much radio resources while SI updating.

Inventors of the present disclosure find out that, the problem of high resource consumption existed in existing technologies is mainly because of: on the one hand, in order to make a UE (User Equipment) successfully receive non-essential system information, essential system information and non-essential system information are constantly broadcasted in cycles. However, since the system information is in an unchanged state for a long period of time, constantly broadcasting of the essential system information and the non-essential system information will consume a large amount of resource. On the other hand, if the non-essential system information is not broadcasted constantly, but is sent when the UE requests, through a dedicated channel. In this case, resource being consumed is less in comparison with that being consumed when the non-essential system information is constantly broadcasted. However, when the system information changes, multiple UEs resided in the cell will request, at a same period of time and through dedicated channels, the base station to send non-essential system information, which will generate large load and high resource consumption. Accordingly, the existing technologies have a problem of high resource consumption.

In the present disclosure, when the system information changes, in following successive N cycles from the next cycle, essential system information and non-essential system information will be broadcasted at the same time, and if a UE (User Equipment) fails to receive the non-essential system information in the successive N cycles from the broadcasting, the dedicated channel will be used to request the base station to send the non-essential system information. Accordingly, technical solution of the present disclosure avoids the problem of large channel load and high channel consumption caused by directly using the dedicated channel to request the base station to send the non-essential system information. Meanwhile, the technical solution of the present disclosure avoids the problem of high system consumption caused by constantly broadcasting the non-essential system information.

In order to make above recited objectives, features and advantages of the present disclosure clear and easy to understand, embodiments of the present disclosure will be illustrated in detailed as follow in combination with corresponding drawings.

Figure 1:
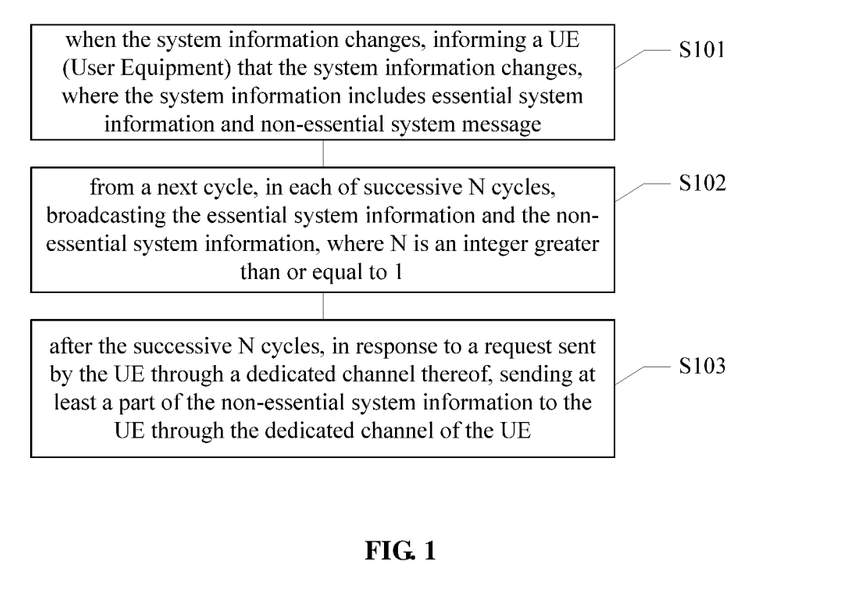
FIG. 1 schematically illustrates a flow chart of a method for updating system information according to one embodiment of the present disclosure.

FIG. 1 is a flow chart of a method for updating system information. Steps of the method will be described as following in combination with FIG. 1.

In step S101, when the system information changes, informing a UE (User Equipment) that the system information changes, where the system information includes essential system information and non-essential system information.

In some embodiments, the system information includes configuration information of a current service cell needed for the UE acquiring a network service, and configuration information relating to an adjacent cell needed during a moving process of the UE. For example, the system information may includes a channel bandwidth, a system frame number, a network ID, residing availability, a configuration relating to measurement, etc. In the present embodiment, the system information includes essential system information and non-essential system information. The essential system information has a small data volume. The essential system information is fundamental information relevant to residing in and accessing to a cell. The non-essential system information is system information other than the essential system information. Different UEs need different non-essential system information, generally speaking, service needs of different UEs are different, thus non-essential system information needs to be acquired is different.

Under a condition of base station updating, reconfiguring or other situations (e.g., call barring), the system information changes. When the system information changes, the base station informs the UE that the system information changes. In some embodiments, the base station may indicate, by way of paging, the UE to re-acquire the system information.

In step S102: from a next cycle, in each of successive N cycles, broadcasting the essential system information and the non-essential system information, where N is an integer greater than or equal to 1.

In some embodiments, the system information can not change in a complete cycle. In other words, if in a wireless cellular communication system, change of the system information happens, new system information will be sent in a next cycle.

In the present embodiment, the non-essential system information and the essential system information are broadcasted in the successive N cycles. Specifically speaking, in each cycle, the essential system information is broadcasted at first, and then the non-essential system information is broadcasted. A number of the non-essential system information is greater than one.

In an exemplary embodiment of the present disclosure, a specific number of the successive N cycles is a preset integer agreed with the UE. For example, the base station and the UE agree that, when the system information changes, the essential system information and the non-essential system information will be broadcasted in the following successive three cycles.

In another exemplary embodiment, when the essential system information is broadcasted in each of the following successive N cycles, the essential system information carries remaining number of times information to inform the UE about remaining number of times (including the present time) for broadcasting the non-essential system information. The remaining number of times (including the present time) for broadcasting the non-essential system information is a number of times that the non-essential system information will be subsequently broadcasted by the base station.

For example, if the base station broadcasts the essential system information and the non-essential system information five times in total from the next cycle, in this case, in a first cycle of the successive five cycles, the remaining number of times for broadcasting the non-essential system information carried in the essential system information is five; in a second cycle, the remaining number of times for broadcasting the non-essential system information carried in the essential system information is four; in a third cycle, the remaining number of times for broadcasting the non-essential system information carried in the essential system information is three, and so on.

It can be seen that, through dynamically carrying the remaining number of times for broadcasting the non-essential system information, the UE can learn about this information timely, so that an efficiency and an accuracy for acquiring the non-essential system information are improved.

In some embodiments, the non-essential system information is broadcasted by a PDSCH (Physical Downlink Shared Channel) channel, and during the broadcasting process, the UE is informed about updated non-essential system information through a SI-RNTI (System-Information-Radio Network Temporary Identity), so that the UE can acquire updated non-essential system information according to a data block indicated by the SI-RNTI.

In some embodiments, in each broadcasting cycle, the essential system information may carry scheduling information of the non-essential system information, so that the UE can receive the non-essential system information according to the scheduling information. Further, based on the scheduling information, a time domain of the non-essential system information corresponding to a service need of the UE can be learned.

In some embodiments of the present disclosure, the non-essential system information may include first non-essential system information and other non-essential system information. The first non-essential system information is the first piece of non-essential system information. In each broadcasting cycle, the first non-essential system information carries scheduling information of the other non-essential system information, so that the UE can acquire needed non-essential system information from the first non-essential system information.

In some embodiments, when broadcasting the non-essential system information, the first non-essential system information is broadcasted according to a manner agreed with the UE. For example, it is agreed that, on a fifth sub-frame in an even-numbered frame, the first non-essential system information is sent three times, and through the SI-RNIT, the UE is informed about a frequency of a sub-carrier for sending the first non-essential system information.

It should be noted that, in some embodiments of the present disclosure, other ways of scheduling for broadcasting the first non-essential system information may be agreed on, to which the present disclosure gives no limitation.

In step S103: after the successive N cycles, in response to a request from the UE through a dedicated channel thereof, sending at least a part of the non-essential system information to the UE through the dedicated channel of the UE.

By implementing the steps S101 and S102, there may exist a UE who does not acquire the non-essential system information broadcasted by the base station in the successive N cycles, in this case, this UE can send a request through a dedicated channel, so as to indicate a failure of receiving the non-essential system information. As a response to the request from the UE, the base station sends at least a part of the non-essential system information to the UE through the dedicated channel of the UE. Specifically, the part of the non-essential system information from the base station to the UE through the dedicated channel includes non-essential system information needed by the UE. For example, the part of the non-essential system information may only include the non-essential system information needed by the UE, or include the non-essential system information needed by the UE and other non-essential system information. In the later condition, the UE needs to implement further identifying and acquiring operations.

It should be noted that, for the successive N cycles as recited above, a specific value of N can be set according to practical requirements, which will not be limited herein.

In some embodiments of the present disclosure, when the system information changes, most UEs can successfully receive the non-essential system information in the successive N cycles. If a UE fails to receive the non-essential system information in the successive N cycles from the broadcasting, then the UE requests, through a dedicated channel of the UE, the base station to send the non-essential system information. However, in existing technologies, when the system information changes, the UE directly requests, through the dedicated channel thereof, the base station to send the non-essential system information. Thus, if multiple UEs request in a same period of time, a large load and a large amount of resource consumption will be caused. Therefore, in comparison with existing technologies, technical solution provided by embodiments of the present disclosure can avoid the UE from directly requesting, through the dedicated channel thereof, the base station to send the non-essential system information, so as to reduce resource consumption.

Further, in the present disclosure, when broadcasting the essential system information and the non-essential system information in the successive N cycles, the essential system information carries remaining number of times for broadcasting the non-essential system information, so that when receiving the essential system information each time, the UE can precisely learn how may times left that the non-essential system information can be received, so that an efficiency and an accuracy of the UE receiving the non-essential system information are improved.

Further, in the present disclosure, when broadcasting the essential system information and the non-essential system information in the successive N cycles, the essential system information or the first essential system information carries scheduling information, so that the UE can receive needed non-essential system information according to the scheduling information. Accordingly, the efficiency and the accuracy of the UE receiving the non-essential system information are further improved.

In some embodiments, if the system information does not change, in response to a request from the UE through its dedicated channel, the UE sends at least a part of the non-essential system information.

Figure 2:
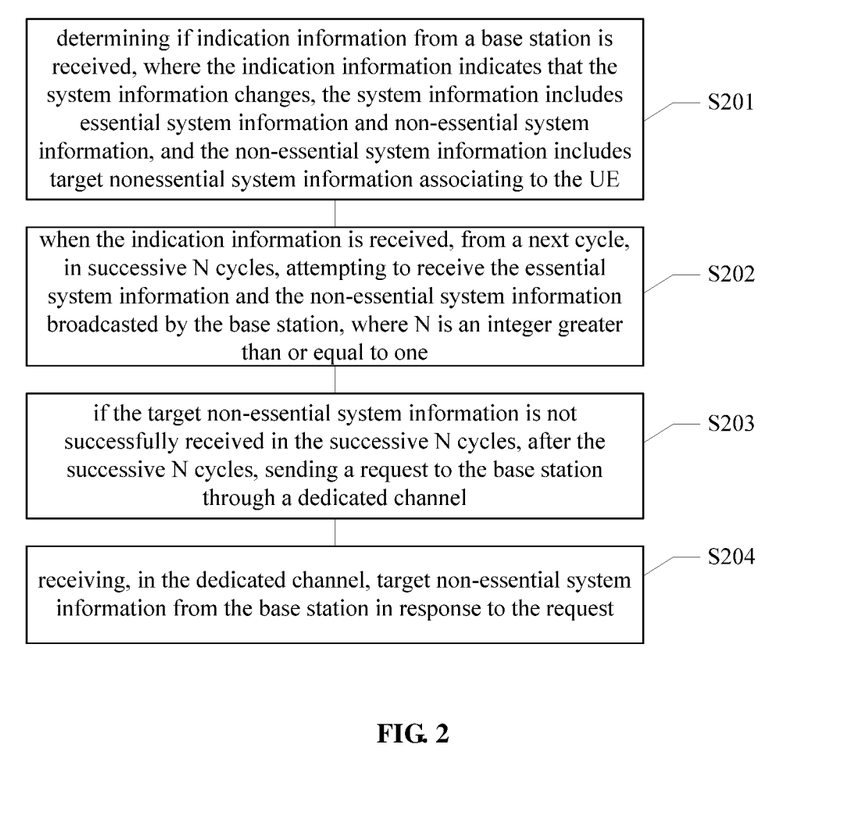
FIG. 2 schematically illustrates a flow chart of a method for acquiring system information according to one embodiment of the present disclosure.

The above recited steps according to embodiments of the present disclosure are applied to the base station side, for example, implemented by the base station. Correspondingly, the UE applies a method as shown in FIG. 2 to obtain the updated system information.

In step S201: determining if indication information from a base station is received, where the indication information indicates that the system information changes, the system information includes essential system information and non-essential system information, and the non-essential system information includes target non-essential system information associating to the UE.

In some embodiments, for the non-essential system information broadcasted by the base station, different UEs need to acquire different non-essential system information according to different service needs. In the present embodiment, the target non-essential system information associating to the UE is the non-essential system information currently needed by the UE.

In some embodiments, the UE determines if indication information from the base station is received, and if the indication information is received, then step S202 will be implemented.

In some embodiments, if the UE fails to receive the indication information from the broadcasting, the UE requests, through a dedicated channel thereof, the base station to send the target non-essential system information. Thereafter, the UE receives, through the dedicated channel, the target non-essential system information from the base station.

In step S202: when the indication information is received, from a next cycle, in successive N cycles, attempting to receive the essential system information and the non-essential system information broadcasted by the base station, where N is an integer greater than or equal to 1.

In some embodiments, when the UE receives the indication information, in the following successive N cycles from the next cycle, the UE attempts to receive the essential system information and the target non-essential system information broadcasted by the base station. In the successive N cycles, the UE may successfully receive the target non-essential system information, or fail to receive the target non-essential system information. If the UE fails to receive the target non-essential system information through the step S202, then step S203 will be implemented.

In some embodiments, when the UE attempts to receive the target non-essential system information broadcasted by the base station, then UE receives the target non-essential system information at a PDSCH channel according to an indication of a SI-RNTI.

In some embodiments, in each of the successive N cycles, when the UE attempts to receive the essential system information and the target non-essential system information broadcasted by the base station, the UE can acquire remaining number of times information from the essential system information, so as to determine remaining number of times for broadcasting the target non-essential system information.

The remaining number of times information indicates remaining number of times for the UE acquiring the non-essential system information through broadcasting of the base station, that is, remaining number of times for the base station broadcasting the non-essential system information subsequently. Through obtaining the remaining number of times information from the essential system information acquired in each of the N cycles, the efficiency and the accuracy for the UE acquiring the non-essential system information are improved.

In some embodiments of the present disclosure, in each of the successive N cycles, the UE attempts to receive the essential system information broadcasted by the base station, where the scheduling information of the target non-essential system information can be obtained from the essential system information, thus the target non-essential system information can be received according to the scheduling information.

In some embodiments of the present disclosure, before the UE attempts to receive the target non-essential system information broadcasted by the base station in each of the successive N cycles, scheduling information can be firstly obtained from first non-essential system information received, so as to receive the target non-essential system information according to the scheduling information. That is to say, in these embodiments, the scheduling information is carried by the first non-essential system information, the target non-essential system information is included in other non-essential system information being broadcasted subsequently, thus the scheduling information can be obtained from the first non-essential system information.

In some embodiments, before attempting to receive the target non-essential system information broadcasted by the base station, the first non-essential system information is received according to a manner agreed with the base station. For example, the UE determines a frequency of a sub-carrier of the first non-essential system information according to an indication of SI-RNTI.

In step S203: if the target non-essential system information is not successfully received in the successive N cycles, after the successive N cycles, sending a request to the base station through a dedicated channel.

In some embodiments, if the target non-essential system information is not successfully received in the successive N cycles, the request is sent to request, directly through the dedicated channel, the base station to send the target non-essential system information. Thereafter, step S204 will be implemented.

In step S204: receiving, in the dedicated channel, target non-essential system information from the base station in response to the request.

In practice, the above recited steps S201 to S204 are applied to the UE, which correspond to the application of steps S101 to S103.

Figure 3:
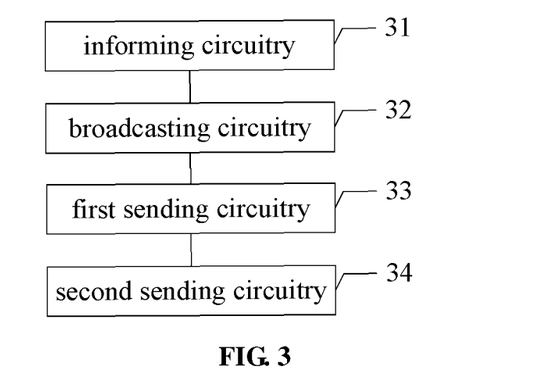
FIG. 3 schematically illustrates a structure of device for updating system information according to one embodiment of the present disclosure.

FIG. 3 is a schematic diagram of a structure of a device for updating system information according to one embodiment of the present disclosure. As shown in FIG. 3, the device for updating system information may include:

An informing circuitry 31 configured to: when the system information changes, inform a UE (User Equipment) that the system information changes, where the system information includes essential system information and non-essential system information.

A broadcasting circuitry 32 configured to: from a next cycle, in each of successive N cycles, broadcast the essential system information and the non-essential system information, where N is an integer greater than or equal to 1.

A first sending circuitry 33 configured to: after the successive N cycles, in response to a request from the UE through a dedicated channel, send at least a part of the non-essential system information to the UE through the dedicated channel of the UE, where the request indicates that the UE fails to receive the non-essential system information from the broadcasting.

In some embodiments, the device for updating a system information may further include:

A second sending circuitry 34 configured to: when the system information does not change, in response to a request from the UE through the dedicated channel, send at least a part of the non-essential system information to the UE.

In some embodiments, the broadcasting circuitry 32 broadcasts the non-essential system information through a PDSCH, and informs the UE about that the non-essential system information changes during broadcasting and through a SI-RNTI.

In some embodiments, a number of the successive N cycles is a preset integer agreed with the UE.

The broadcasting circuitry 32 broadcasts the essential system information in each of the successive N cycles, where the essential system information carries remaining number of times information to inform the UE about remaining number of times for broadcasting the non-essential system information.

In some embodiments, the essential system information may carry scheduling information of the non-essential system information, so that the UE can receive the non-essential system information according to the scheduling information.

In some embodiments, the non-essential system information includes first non-essential system information and other non-essential system information. The first non-essential system information carries scheduling information of the other non-essential system information, so that the UE can receive the other non-essential system information according to the scheduling information.

In some embodiments, when broadcasting the non-essential system information, the broadcasting circuitry 32 broadcasts the first non-essential system information by a manner agreed with the UE. For example, the first non-essential system information is sent three times on a fifth sub-frame in an even-numbered frame, and through the SI-RNIT, the UE is informed about a frequency of a sub-carrier for sending the first non-essential system information.

Figure 4:
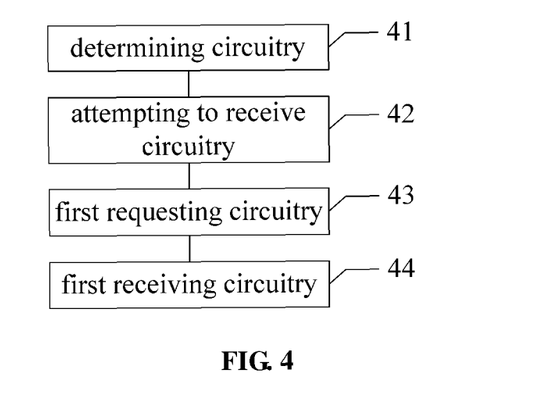
FIG. 4 schematically illustrates a structure of device for acquiring system information according to one embodiment of the present disclosure.

In practice, the device for updating a system information is applied to the base station. Structure illustrations and advantages relating to the device for updating a system information can refer to the flow chart of the method for updating a system information as shown in FIG. 1. FIG. 4 is a schematic diagram of a structure of device for acquiring system information. As shown in FIG. 4, the device for acquiring a system information may include:

A determining circuitry 41 configured to: determine if indication information from a base station is received, where the indication information indicates that the system information changes, the system information includes essential system information and non-essential system information, and the non-essential system information includes target non-essential system information associating to the UE.

An attempting to receive circuitry 42 configured to: when the indication information is received, from a next cycle, in successive N cycles, attempt to receive the essential system information and the non-essential system information broadcasted by the base station, where N is an integer greater than or equal to 1.

A first requesting circuitry 43 configured to: if fails to receive the target non-essential system information in the successive N cycles from the broadcast, after the successive N cycles, send a request to the base station through a dedicated channel.

A first receiving circuitry 44 configured to: receive, in the dedicated channel, target non-essential system information, where the target non-essential system information is a response of the base station to the request.

In some embodiments, the device for acquiring a system information ma further include:

A second requesting circuitry (not shown in FIG. 4) configured to: if fail to receive the indication information from the broadcast, request, through the dedicated channel, the base station to send the target non-essential system information.

A second receiving circuitry (not shown in FIG. 4) configured to: receive, at the dedicated channel, the target non-essential system information from the base station.

In some embodiments, the attempting to receive circuitry 42 is configured to: when attempt to receive the target non-essential system information broadcasted by the base station, receive the target non-essential system information at a PDSCH channel according to an indication of a SI-RNTI.

In some embodiments, a number of the successive N cycles is a preset integer agreed with the base station.

In some embodiments, the first receiving circuitry 42 is configured to: when attempt to receive the essential system information and the target non-essential system information broadcasted by the base station in each of the successive N cycles, obtain remaining number of times information from the essential system information, so as to determine remaining number of times for broadcasting the target non-essential system information.

In some embodiments, the attempting to receive circuitry 42 is configured to: when attempt to receive the essential system information broadcasted by the base station in each of the successive N cycles, obtain scheduling information of the target non-essential system information from the essential system information, so as to receive the target non-essential system information according to the scheduling information.

In some embodiments, the non-essential system information includes first non-essential system information and other non-essential system information. The target non-essential system information is included in the other non-essential system information. The attempting to receive circuitry is configured to: before attempt to receive the target non-essential system information broadcasted by the base station in each of the successive N cycles, obtain scheduling information from the first non-essential system information, so as to receive the target non-essential system information according to the scheduling information.

In some embodiments, the attempting to receive circuitry 42 is configured to: before attempt to receive the target non-essential system information broadcasted by the base station, receive the first non-essential system information according to a manner agreed with the base station.

In some embodiments, the device for acquiring a system information is applied to the UE. Structure description and advantages relating to the device for acquiring a system information can refer to the flow chart of the method for acquiring a system information as shown in FIG. 2, which will not be described in detail herein.

Those skilled in the art can understand that, all steps or some of the steps in various methods of above recited embodiments of the present disclosure can be accomplished by hardware under instruction of programs. The programs can be stored in a readable storage medium of a computer, wherein the storage medium may include: ROM (Read Only Memory), RAM (Random Access Memory), magnetic disk, light disk, etc.

Although the present disclosure has been disclosed above with reference to preferred embodiments thereof, it should be understood by those skilled in the art that various changes and modifications may be made without departing from the spirit or scope of the disclosure. Accordingly, the present disclosure covers changes and modifications made to the present disclosure that fall into scopes defined by the claims and equivalent technical solutions thereof.

The invention claimed is:

1. A method for updating system information, comprising:
when the system information changes, informing a UE (User Equipment) that the system information changes, where the system information comprises essential system information and non-essential system information;
from a next cycle, in each of successive N cycles, broadcasting the essential system information and the non-essential system information, where N is an integer greater than or equal to 1; and
after the successive N cycles, in response to a request from the UE through a dedicated channel of the UE, sending at least a part of the non-essential system information to the UE through the dedicated channel of the UE, where the request indicates that the UE fails to receive the non-essential system information from the broadcasting.

2. The method for updating system information according to claim 1, further comprising:
when the system information does not change, in response to a request from the UE through the dedicated channel of the UE, sending at least a part of the non-essential system information to the UE.

3. The method for updating system information according to claim 1, wherein the non-essential system information is broadcasted through a physical downlink shared channel, and the UE is informed about updated system information through a SI-RNTI (System Information Radio Network Temporary Identity) during broadcasting.

4. The method for updating system information according to claim 1, wherein a number of the successive N cycles is a preset integer agreed with the UE.

5. The method for updating system information according to claim 1, wherein when broadcasting the essential system information in each of the successive N cycles, the essential system information carries remaining number of times information to inform the UE about remaining number of times for broadcasting the non-essential system information.

6. The method for updating system information according to claim 1, wherein the essential system information carries scheduling information of the non-essential system information, so that the UE can receive the non-essential system information according to the scheduling information.

7. The method for updating system information according to claim 1, wherein the non-essential system information comprises first non-essential system information and other non-essential system information, and the first non-essential system information carries scheduling information of the other non-essential system information, so that the UE can receive the other non-essential system information according to the scheduling information.

8. The method for updating system information according to claim 7, wherein when broadcasting the non-essential system information, the first non-essential system information is broadcasted according to a manner agreed with the UE.

9. A method for acquiring system information, comprising:
determining if indication information from a base station is received, where the indication information indicates that the system information changes, the system information comprises essential system information and non-essential system information, and the non-essential system information comprises target non-essential system information associating to a UE (User Equipment);
when the indication information is received, from a next cycle, in successive N cycles, attempting to receive the essential system information and the target non-essential system information broadcasted by the base station, where N is an integer greater than or equal to 1;
if in the successive N cycles, the target non-essential system information is not received successfully, after the successive N cycles, sending a request to the base station through a dedicated channel of the UE; and
receiving, on the dedicated channel, target non-essential system information from the base station in response to the request.

10. The method for acquiring system information according to claim 9, further comprising:

if the indication information is not received, requesting, through the dedicate channel, the base station to send the target non-essential system information; and receiving, at the dedicated channel, the target non-essential system information from the base station.

11. The method for acquiring system information according to claim 9, wherein when attempting to receive target non-essential system information broadcasted by the base station, the target non-essential system information is received on a physical downlink shared channel according to an indication of a SI-RNTI (System Information Radio Network Temporary Identity).

12. The method for acquiring system information according to claim 9, wherein a number of the successive N cycles is a preset integer agreed with the base station.

13. The method for acquiring system information according to claim 9, wherein when attempting to receive essential system information and a target non-essential system information broadcasted by the base station in each of the successive N cycles, remaining number of times information is obtained from the essential system information, so as to determine remaining number of times for broadcasting the target non-essential system information.

14. The method for acquiring system information according to claim 9, wherein when attempting to receive essential system information broadcasted by the base station in each of the successive N cycles, scheduling information of the target non-essential system information is obtained from the essential system information, so as to receive the target non-essential system information according to the scheduling information.

15. The method for acquiring system information according to claim 9, wherein the non-essential system information comprises first non-essential system information and other non-essential system information, the target non-essential system information is comprised in the other non-essential system information, and before attempting to receive the target non-essential system information broadcasted by the base station in each of the successive N cycles, scheduling information is obtained from the first non-essential system information, so as to receive the target non-essential system information according to the scheduling information.

16. The method for acquiring system information according to claim 15, wherein before attempting to receive the target non-essential system information broadcasted by the base station, the first non-essential system information is received according to a manner agreed with the base station.

17. A device for updating system information, comprising:
an informing circuitry configured to: when the system information changes, inform a UE (User Equipment) that the system information changes, wherein the system information comprises essential system information and non-essential system information;
a broadcasting circuitry configured to: from a next cycle, in each of successive N cycles, broadcast the essential system information and the non-essential system information, wherein N is an integer greater than or equal to 1; and
a first sending circuitry configured to: after the successive N cycles, in response to a request from the UE through a dedicated channel of the UE, send at least a part of the non-essential system information to the UE through the dedicated channel of the UE, wherein the request indicates that the UE fails to receive the non-essential system information from the broadcast.

18. The device for updating system information according to claim 17, further comprising:
a second sending circuitry configured to: when the system information does not change, in response to a request from the UE through the dedicated channel of the UE, send at least a part of the non-essential system information to the UE.

19. The device for updating system information according to claim 17, wherein the broadcasting circuitry broadcasts the non-essential system information through a physical downlink shared channel, and informs the UE that the system information changes through a SI-RNTI (System Information Radio Network Temporary Identity) during broadcasting.

20. The device for updating system information according to claim 17, wherein a number of the successive N cycles is a preset integer agreed with the UE.

21. The device for updating system information according to claim 17, wherein when the broadcasting circuitry broadcasts the essential system information in each of the successive N cycles, the essential system information carries remaining number of times information to inform the UE about remaining number of times for broadcasting the non-essential system information.

22. The device for updating system information according to claim 17, wherein the essential system information carries scheduling information of the non-essential system information, so that the UE can receive the non-essential system information according to the scheduling information.

23. The device for updating system information according to claim 17, wherein the non-essential system information comprises first non-essential system information and other non-essential system information, and the first non-essential system information carries scheduling information of the other non-essential system information, so that the UE can receive the other non-essential system information according to the scheduling information.

24. The device for updating system information according to claim 23, wherein when the broadcasting circuitry broadcasts the non-essential system information, the first non-essential system information is broadcasted according to a manner agreed with the UE.

25. A device for acquiring system information, comprising:
a determining circuitry configured to: determine if indication information from a base station is received, wherein the indication information indicates that the system information changes, the system information comprises essential system information and non-essential system information, and the non-essential system information comprises target non-essential system information associating to a UE (User Equipment);
an attempting to receive circuitry configured to: when the indication information is received, from a next cycle, in successive N cycles, attempt to receive the essential system information and the target non-essential system information broadcasted by the base station, where N is an integer greater than or equal to 1;
a first requesting circuitry configured to: if in the successive N cycles, the target non-essential system information is not received successfully, after the successive N cycles, send a request to the base station through a dedicated channel of the UE; and
a first receiving circuitry configured to: receive, on the dedicated channel, target non-essential system information from the base station in response to the request.

26. The device for acquiring system information according to claim 25, further comprising:
- a second requesting circuitry configured to: if the indication information is not received, request, through the dedicate channel, the base station to send the target non-essential system information; and
- a second receiving circuitry configured to: receive, at the dedicated channel, the target non-essential system information from the base station.

27. The device for acquiring system information according to claim 25, wherein when the attempting to receive circuitry attempts to receive target non-essential system information broadcasted by the base station, the target non-essential system information is received on a physical downlink shared channel according to an indication of a SI-RNTI (System Information Radio Network Temporary Identity).

28. The device for acquiring system information according to claim 25, wherein a number of the successive N cycles is a preset integer agreed with the base station.

29. The device for acquiring system information according to claim 25, wherein the first receiving circuitry is configured to: when attempt to receive essential system information and target non-essential system information broadcasted by the base station in each of the successive N cycles, obtain remaining number of times information from the essential system information, so as to determine remaining number of times for broadcasting the target non-essential system information.

30. The device for acquiring system information according to claim 25, wherein when the attempting to receive circuitry attempts to receive essential system information broadcasted by the base station in each of the successive N cycles, scheduling information of the target non-essential system information is obtained from the essential system information, so as to receive the target non-essential system information according to the scheduling information.

31. The device for acquiring system information according to claim 25, wherein the non-essential system information comprises first non-essential system information and other non-essential system information, the target non-essential system information is comprised in the other non-essential system information, and the attempting to receive circuitry is configured to: before attempt to receive the target non-essential system information broadcasted by the base station in each of the successive N cycles, obtain scheduling information the first non-essential system information, so as to receive the target non-essential system information according to the scheduling information.

32. The device for acquiring system information according to claim 31, wherein the attempting to receive circuitry is configured to: before attempt to receive the target non-essential system information broadcasted by the base station, receive the first non-essential system information according to a manner agreed with the base station.

\* \* \* \* \*